Sept. 30, 1924.
J. A. ADLER
1,510,026
REAR LIGHT, LICENSE PLATE, AND HOLDER THEREFOR
Filed Nov. 18, 1922
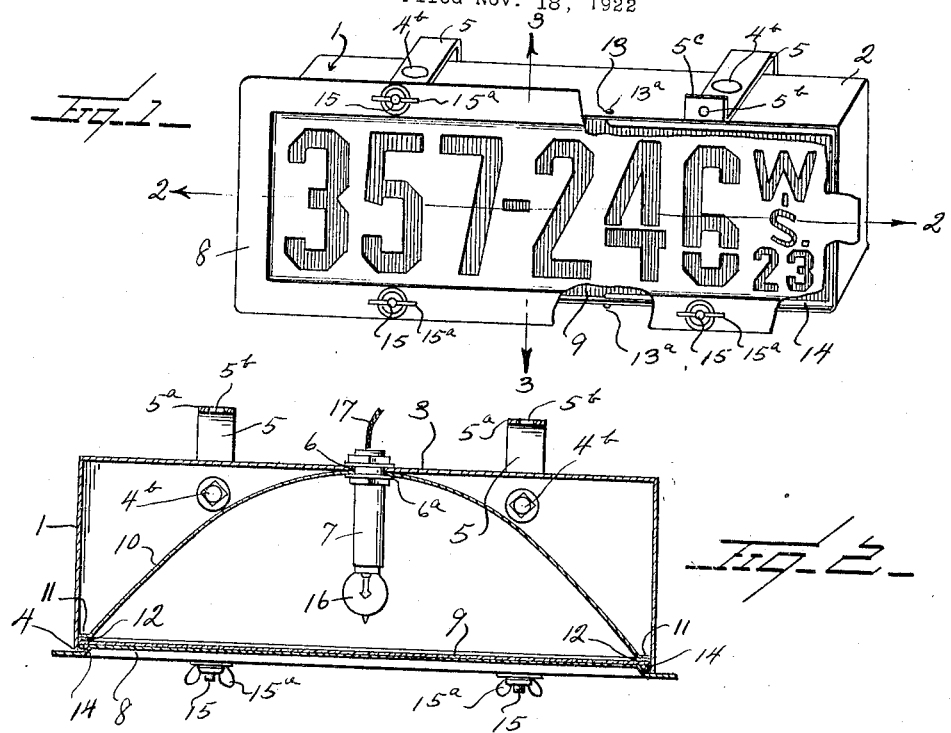
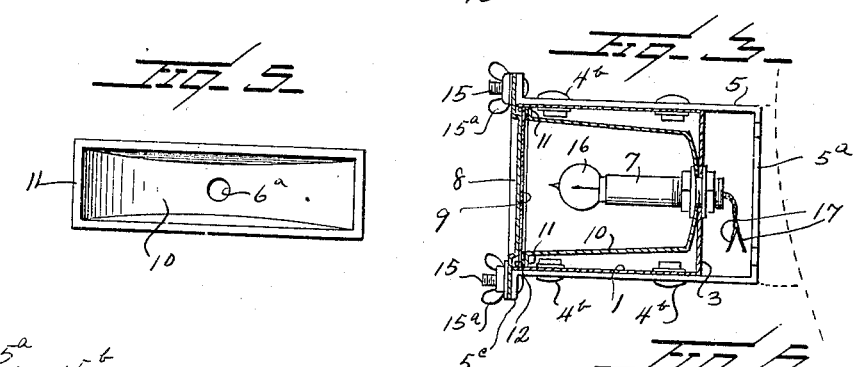
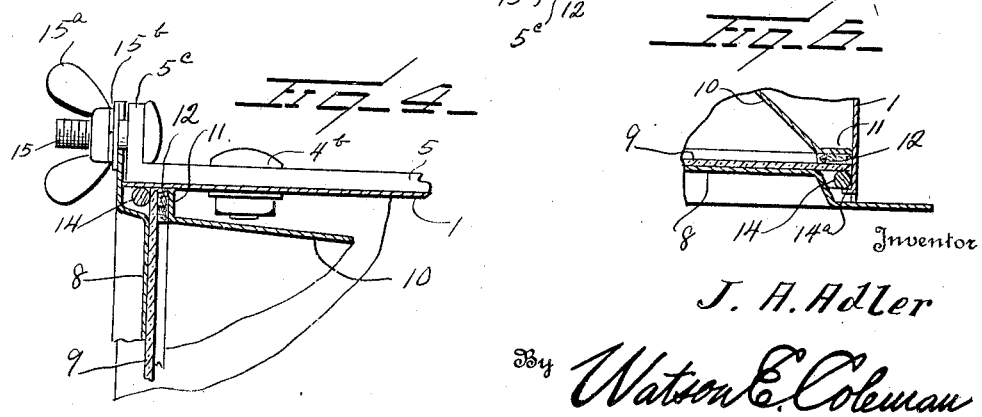
Inventor
J. A. Adler
By Watson E. Coleman
Attorney Patented Sept. 30, 1924.

1,510,026

UNITED STATES PATENT OFFICE.

JOHN A. ADLER, OF NORTH MILWAUKEE, WISCONSIN.

REAR LIGHT, LICENSE PLATE, AND HOLDER THEREFOR.

Application filed November 18, 1922. Serial No. 601,755.

*To all whom it may concern:*

Be it known that I, JOHN A. ADLER, a citizen of the United States, residing at North Milwaukee, in the county of Milwaukee and State of Wisconsin, have invented certain new and useful Improvements in a Rear Light, License Plate, and Holder Therefor, of which the following is a specification, reference being had to the accompanying drawings.

This invention relates to automobile accessories, and particularly to the license plate display means.

The object of the present invention is to provide a combined tail light and license plate holder adapted to support a cut out license plate so that the light may be discharged through the plate in such manner that the license plate may be distinguished at a distance at night as well as by day, the illuminated license plate also acting as a warning light as required on automobiles in various States.

A further object is to provide a device of this character which is simple, efficient and thoroughly practical, and to provide a holder of this character including a reflector which is a true parabola in shape, insuring a proper horizontal dispersion of the light.

A still further object is to provide means whereby the license plate and the transparent sheet may be held in front of the reflector in such manner as to avoid rattling of the various parts and to prevent the entrance of moisture.

Other objects will appear in the course of the following description.

In the drawings:—

Figure 1 is a view in perspective of the improved rear light, license or indicator plate and holder therefor constructed in accordance with the invention;

Figure 2 is a horizontal longitudinal sectional view on line 2—2 of Figure 1;

Figure 3 is a vertical transverse sectional view on line 3—3 of Figure 1;

Figure 4 is an enlarged detail view of the joint between the license plate proper and the transparent sheet and the margin of the sides of the casing;

Figure 5 is a rear elevation on a reduced scale of the reflector removed from the casing;

Figure 6 is a detail view of the means for holding one of the spring loops in its latched position, when closed, for the purpose of holding the transparent sheet in position.

Referring to the drawings, 1 designates a casing which may be any suitable size and shape, preferably rectangular, therefore provided with flat sides 2. The casing also has a flat back 3, though not necessarily, as well as flat ends. The rear of the casing is open as shown at 4, and across this extends the license plate proper and the transparent sheet, which will be hereafter described.

The casing may be constructed of any suitable material, preferably sheet metal, such as aluminium or the like, it being obvious that the casing may be pressed out of one piece of such material.

Bolted, riveted or otherwise secured at $4^b$ to the upper and lower faces of the casing are the parallel arms of the U-shaped strips or brackets 5. There are two of these brackets, although any number may be used, and their transverse portions $5^a$ are provided with apertures or openings $5^b$, for the reception of suitable fastening means, by which the brackets may be secured to any part of the vehicle. It will be noted that the transverse portions $5^a$ are spaced from the forward face of the casing 1, so as to permit of access to the conductor wires leading to the electric lamp bulb.

The front wall of the casing is provided with a suitable opening 6, in which a conventional form of electric lamp socket 7 with bulb 16 may be secured. The means for fastening the lamp socket in the opening of the front wall of the casing 1 also clamps the reflector (which is a true parabola in shape) in the casing 1.

The ends of the parallel arms of the brackets 5 have lateral ears $5^c$, through which suitable bolts 15 pass, there being wing nuts $15^a$ on said bolts for fastening the license plate 8 securely to the casing.

The license or indicator plate 8 is dished as illustrated, so as to protrude slightly into the interior of the casing 1. This license plate indicator has its number or indicia or other data perforated or punched out of the plate and arranged behind the license plate is a transparent sheet 9, which may be made of any suitable material, preferably a composite of celluloid and paper, red in color. This transparent sheet is frosted on one side and highly polished on the exterior or rear face. The reflector 10 consists of a three dimensional parabola, as shown in Figure 5, which may be made of any suitable sheet metal, preferably aluminium, or German silver plate pressed in one piece. The interior of this reflector is highly polished. The front wall of the reflector has an opening 6ª, through which the lamp socket 7 extends. By providing a three dimensional parabola reflector, a true horizontal dispersion of light is insured.

The rear marginal edge of the reflector 10 is provided with a lateral flange 11, upon the rear surface of which a packing 12 of any suitable material, preferably strip felt or the like, is adhesively secured. The lateral flange 11 of the reflector 10 engages the inner face of the casing 1, and it will be noted that the felt also partly lies against the inner face of the casing 1 to exclude moisture and foreign matter. Obviously the front wall of the reflector engages with the inner face of the front wall of the casing 1, so that the openings 6 and 6ª will register in order to permit the lamp socket holding means to hold the two walls clamped securely together and thereby support the lamp socket rigidly in position and in such wise as to prevent rattling.

The transparent sheet 9 is designed to be of a size to fit within the casing 1, so that its edge will contact with the wall of the casing 1. In fact the transparent sheet 9 is fitted against the packing of strip felt 12, and in order to clamp this transparent sheet in position against the felt, suitable spring clamps 14 made of spring wire are provided. These spring clamps are U-shaped as shown, and the arms thereof have lateral lugs 13ª, which engage with the openings or apertures 13 of the upper and lower walls of the casing 1. There are two of the U-shaped spring clamps, and they are of such size as to fit between the upper and lower walls of the casing in such a manner that their transverse portions will engage with the end walls of the casing 1. In fact, the end walls of the casing 1 have inwardly extending lugs 14ª, which overlie the transverse portions of the U-shaped spring clamps to hold them against the transparent sheet, which in turn is held against the packing of strip felt 12. As previously stated, the U-shaped spring clamps lie against the inner faces of the upper, lower and end walls of the casing 1 and thereby hold the transparent sheet tightly against the felt in such a manner as to prevent rattling and to exclude moisture or foreign substances, such as dust, water, etc.

As previously stated, the license or indicator plate proper 8 is dished throughout its entirety, with the exception of a short distance from the edge of the plate, thereby providing a flanged offset which engages with the lateral lugs 5ᶜ of the arms of the strips or brackets 5. The bolts 15 pass through notches formed in this flanged offset so that when the wing nuts are turned home and clamped against the offset flange, the license or indicator plate will be clamped securely in place. Since this plate is dished, as previously stated, it will also bear against the central portion of the transparent sheet in order to hold the transparent sheet more firmly against the felt. The dished portion of the license or indicator plate proper is of such a size as to fit between the upper and lower arms of the U-shaped spring clamps.

Prior to applying the wing nuts, suitable spring washers 15ᵇ are placed upon the shanks of the bolts so that when the wing nuts are tightened they will bear against the washers and insure a yieldable clamping action on the offset flange of the license or indicator plate proper to prevent the same from rattling or from displacement.

The usual conductor wires 17 (which may be made in one cord) pass through the lamp socket and connect with the lamp in the usual manner. These conductor wires 17 may in turn connect to a suitable storage battery (not shown).

Obviously the outer face of the casing 1 is designed to be painted a standard dark blue, while the rear face of the license or indicator plate proper is to be painted a light color.

In most other devices of this character, when dismantling the license or indicator plate it is necessary to bend certain of the metal parts, and if the dismantling is frequent, it is possible that the metal will soon break or fracture, which will render it incapable of further use. In the present device this disadvantage is entirely avoided since the entire construction can be very easily dismantled without bending or distorting any part thereof. It is only necessary to remove the wing nuts, then remove the license plate 8, then move the U-shaped spring clamps on their pivots and detach the transparent sheet. It is then possible to have easy access to the electric lamp socket, which may be easily unscrewed by removing its securing means, such as nuts or the like. When the parts are so disassembled, any part may be easily repaired or renewed or cleaned.

I have heretofore referred to the fact that the transparent sheet 9 is preferably composed of celluloid and paper.

While I have illustrated one method of attaching the device to an automobile and find this manner of attachment preferable, yet obviously other means of attaching the device to the automobile may be used in order to accommodate the device to various makes of cars.

The invention having been set forth, what is claimed is:—

1. In a combined rear light, license plate and holder therefor, an outer casing, a second casing mounted in the first named casing and opening toward the rear of the first named casing, the rear end of the inner casing having flanges terminating short of the rear end of the outer casing, means for fastening the two casings together, a transparent sheet engaging against the flanges of the inner casing, and a pair of U-shaped spring clamps, each having the extremities of its arms angularly bent and inserted through the upper and lower walls of the first named casing, said clamps being shiftable to a position to hold the transparent sheet in place, the end walls of the outer casing having inwardly extending lugs overlying the cross bar of each of said clamps, and a stenciled number plate engaged with the ends of the outer casing rearward of the transparent plate.

2. A combined rear light, license plate and holder therefor comprising an outer casing, a reflector mounted within the outer casing, means for supporting the reflector therein, an electric lamp socket disposed within the reflector, a transparent sheet disposed against the flanges of the reflector, means for holding the transparent sheet in place, a plurality of supporting members attached to the casing and extending to the forward edge thereof and outwardly flanged at their extremities, a license number plate having a dished middle portion bearing against the transparent sheet, the outer margin of the license plate extending beyond the edge of the casing and being detachably engaged with the flanges of said U-shaped supporting members.

3. A combined rear light, license plate and holder therefor comprising an outer casing, a reflector mounted within the outer casing, the rear end of said reflector being flanged and this rear flanged end being disposed inward of the rear end of the casing, means for holding the reflector in place within the casing, an electric lamp socket disposed within the reflector, U-shaped members embracing the casing and engaging the upper and lower walls thereof, the forward ends of said U-shaped members being angularly flanged, a transparent sheet disposed against the end edges of the reflector, a license number plate abutting against the end of the outer casing and being dished at its middle to bear against the transparent plate and having its margin extending over the flanges of said U-shaped members, and detachable fastening means passing through the flanges of the members and through said license plate and holding the license plate in place.

In testimony whereof I hereunto affix my signature.

JOHN A. ADLER.